Figure 1:
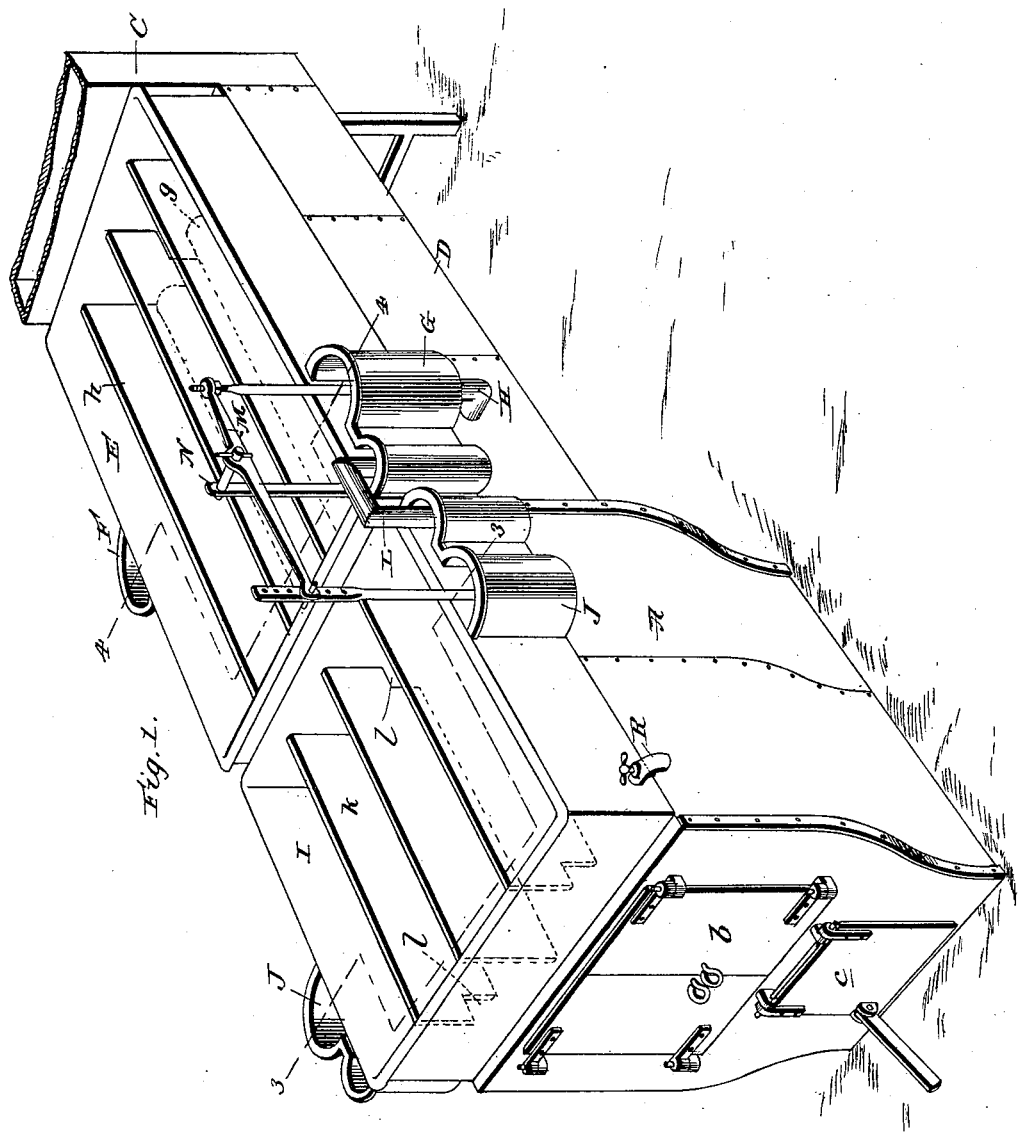

No. 631,958. Patented Aug. 29, 1899.
M. L. DUNHAM.
EVAPORATING PAN.
(Application filed May 10, 1899.)

(No Model.) 2 Sheets—Sheet 1.

Witnesses: Inventor
M. L. Dunham
By James J. Sheehy
Attorney

No. 631,958. Patented Aug. 29, 1899.
M. L. DUNHAM.
EVAPORATING PAN.
(Application filed May 10, 1899.)
(No Model.) 2 Sheets—Sheet 2.
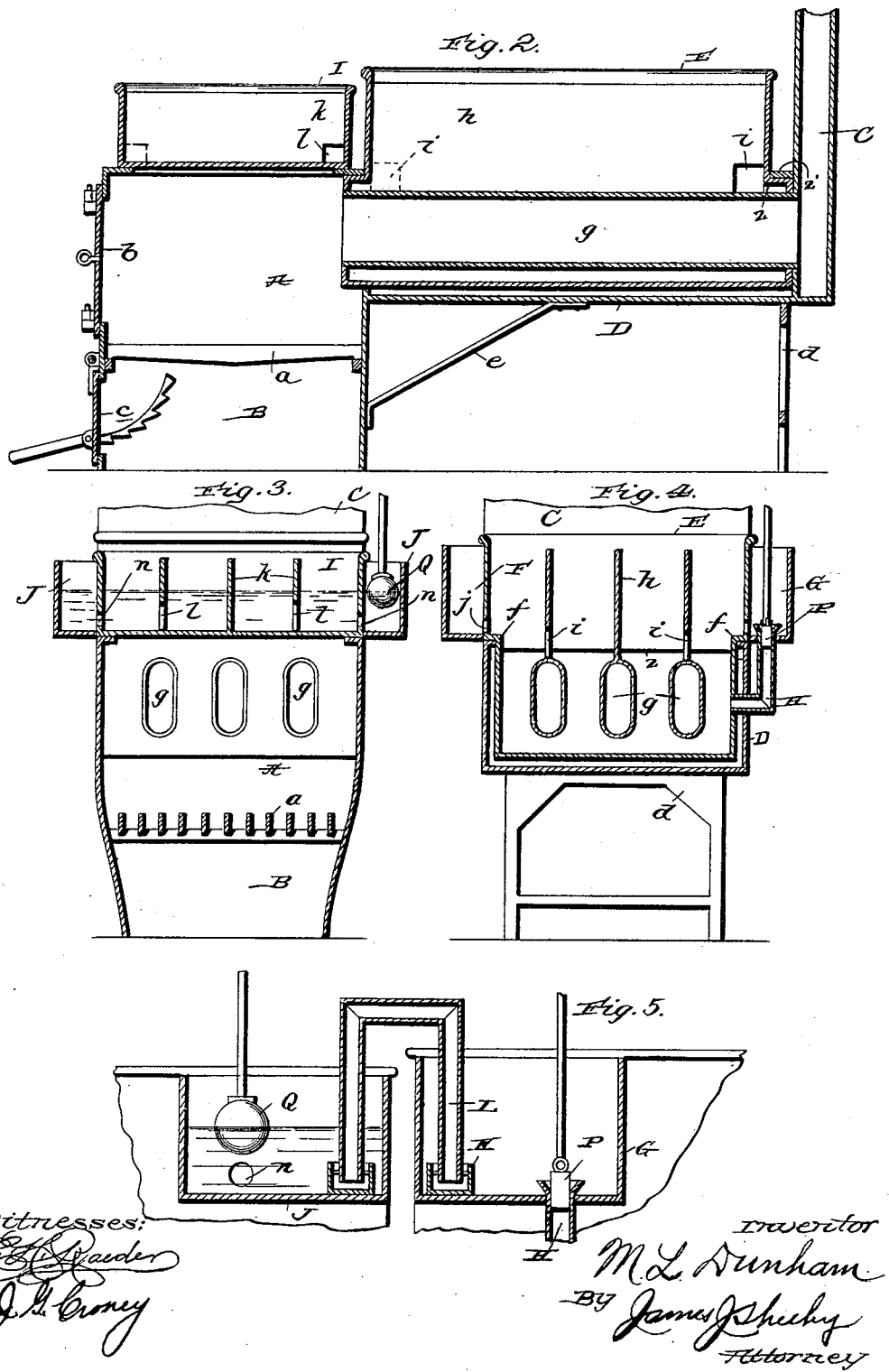

UNITED STATES PATENT OFFICE.

MORTON LINCOLN DUNHAM, OF TOLEDO, CANADA.

EVAPORATING-PAN.

SPECIFICATION forming part of Letters Patent No. 631,958, dated August 29, 1899.

Application filed May 10, 1899. Serial No. 716,330. (No model.)

*To all whom it may concern:*

Be it known that I, MORTON LINCOLN DUNHAM, a citizen of the Dominion of Canada, residing at Toledo, in the county of Leids and Province of Ontario, Canada, have invented new and useful Improvements in Evaporators, of which the following is a specification.

My invention relates to sap-evaporators, and has for its general object to provide an evaporator which while embracing a very simple and inexpensive construction is calculated to effect rapid evaporation of maple-sap and other juice and automatically perform all of the functions necessary to the reduction of the sap or juice to syrup.

Another object of the invention is to provide an evaporator embracing a sap-pan, a syrup-pan, and a siphon connection for conducting partially-evaporated sap from the former to the latter, the syrup-pan preferably being reversible in order to avoid the accumulation in said pan of calcium malate inherent in the sap.

Other objects and advantages of the invention will be fully understood from the following description and claims when taken in conjunction with the annexed drawings, in which—

Figure 1 is a perspective view of my improved evaporator. Fig. 2 is a longitudinal central section on a reduced scale. Fig. 3 is a transverse section taken on the line 3 3 of Fig. 1. Fig. 4 is a similar view taken on line 4 4 of Fig. 1. Fig. 5 is a detail longitudinal section on an enlarged scale, illustrating a part of the mechanism for controlling the flow of sap from the sap-pan to the syrup-pan.

In the said drawings similar letters designate corresponding parts in all of the several views.

My improved sap-evaporator is preferably formed of sheet metal, although it may be formed of any other material suitable to the purpose of the invention. It is provided at one end with a fire-box A, having a grate $a$ and one or more doors $b$, and is also provided with an ash-chamber B, having a suitable door $c$.

C is a smoke-stack or uptake arranged about the proportional distance illustrated from the fire-box A, and D is what I will for convenience of description term a "casing." The said casing is interposed between and connected with the fire-box A and uptake C and in the preferred embodiment of the invention is supported by a leg $d$ and a strut or brace $e$, as shown in Fig. 2.

E is a sap-pan which is arranged in the casing D and is provided with shoulders $f$, designed to bear on the edges of the side walls of the casing, and is also provided with a lower reduced portion, between which and the walls of the casing a space is formed, as shown. Said space tends to prevent the radiation of heat from the sap-pan. It is not, however, essential, and therefore the lower portion of the sap-pan may be made of a size to snugly fit the casing D without departing from the scope of my invention. The pan E is provided with reduced portions $z$ at its ends, arranged below horizontal portions $z'$ of the casing, and has a plurality of longitudinal flues $g$, which communicate at their opposite ends with a fire-box and smoke-stack, respectively, and have for their purpose to conduct flames and products of combustion from the former to the latter. The pan E is also provided with longitudinal vertical partitions $h$, which are disposed upon the flues $g$ and are provided with openings $i$. These openings are arranged as shown in Figs. 2 to 4—that is to say, the opening of one partition is arranged at the end of the pan opposite to the opening in the adjoining partition or partitions, this arrangement being resorted to in order to compel the sap to take a zigzag or tortuous course and insure its traversing the full length of the highly-heated flues $g$ in circulating from one compartment of the pan to another, which materially facilitates the evaporation of the sap. At one side the pan E is preferably provided with a pocket F, which communicates with an opening $j$ in the side wall of the pan and is designed for the reception of the sap to be evaporated, and at its other side said pan E is provided with a pocket G, which is connected with the interior of the pan by a conduit H.

I is a syrup-pan which is removably placed on the open top of the fire-box A. This pan I has partitions $k$, provided with openings $l$, arranged in the same manner and for the same purpose as the openings $i$ of the partitions $h$ in pan E. It also has pockets J, arranged as best shown in Fig. 1, which pockets are connected with its interior by openings $n$.

K are cups arranged in the pockets G J of the sap-pan and syrup-pan, respectively, and L is a siphon, which has for its purpose to convey the partially-evaporated sap from the pocket G to the adjacent pocket J. The ends of the siphon are arranged in the cups K, as shown in Fig. 5, and hence it will be seen that exhaustion of the siphon will be prevented when the supply of sap to the pocket G is cut off, as presently described.

M is a lever fulcrumed on an upright N, rising from the sap-pan E. P is a valve connected to one end of the lever and arranged to seat in the end of the conduit H, and Q is a float, preferably a hollow metallic ball, which is connected in an adjustable manner to the opposite end of the lever and is arranged and adapted to move in the pocket J of the syrup-pan I. By virtue of this construction when the float is raised to a predetermined height by the sap in the pocket J the valve P will be seated in the upper end of the conduit H and the supply of sap to the pocket G will be cut off and the sap or syrup in the syrup-pan I will be maintained at a certain predetermined height. The valve P will remain closed until the syrup is drawn from the pan I through its faucet R or until the height of the syrup in said pan I is reduced to a certain extent by evaporation, when the valve will be opened and kept in its open position until the syrup in the pan I again reaches the predetermined height, when said valve will again be closed. In this way the proper quantity of sap is automatically maintained in the pan I, with the result that the reduction of the sap to syrup is facilitated and waste of sap or syrup prevented. It will also be appreciated that by reason of the automatic feed from the sap-pan to the syrup-pan the apparatus requires but a minimum amount of attention from an attendant.

The syrup-pan I is preferably made removable and provided with two pockets J, arranged as shown in Fig. 1, in order that it may be reversed when desired to prevent accumulation of calcium malate, which is inherent in maple-syrup.

In the operation of my improved evaporator the heavier portion of the sap in the pan E will settle in the lower part of the pan, while the lighter portion will remain in the upper part of the pan and will be caused by the partitions $h$ to circulate in a tortuous course. When the valve P is open, the partially-evaporated sap will pass from pan E through conduit H into the pocket G. From said pocket G the sap is conducted by the siphon L into the adjacent pocket J of the syrup-pan I, from whence the syrup is drawn when desired through the cock R. It will be observed that the apparatus is calculated to quickly effect the evaporation and that therefore its capacity is large.

The fire-box A is preferably made of such size as to enable it to receive large pieces of wood. It is obvious, however, that its size may be varied according to the fuel which it is desired to burn.

Having thus described my invention, what I claim is—

1. An evaporator comprising a fire-box, a smoke-stack or uptake, a casing interposed between and connected to the fire-box and smoke-stack, a sap-pan seated in the casing and having longitudinal flues communicating at their ends with the fire-box and smoke-stack and also having longitudinal partitions arranged on the flues and provided with openings, a syrup-pan arranged on the fire-box and having partitions provided with openings, and suitable means for conducting sap from the sap-pan to the syrup-pan, substantially as and for the purpose set forth.

2. In an evaporator, the combination of a sap-pan having a pocket connected with its interior, a reversible syrup-pan having pockets at its opposite sides, cups arranged in the pockets of the pans, a siphon connecting the pocket of the sap-pan and the adjacent pocket of the syrup-pan and having its ends arranged in the cups therein, a valve for controlling communication between the pocket of the sap-pan and the interior of said pan, and a float arranged in the pocket of the syrup-pan adjacent to the pocket of the sap-pan and connected to the valve, substantially as specified.

3. In an evaporator, a sap-pan having longitudinal flues for the passage of smoke and products of combustion and also having longitudinal, vertical partitions arranged upon and connected to the flues and having openings $i$ arranged, substantially as and for the purpose set forth.

In testimony whereof I have hereunto set my hand in presence of two subscribing witnesses.

MORTON LINCOLN DUNHAM.

Witnesses:
I. M. BRECKELS,
JOHN R. LAVELL.